Dec. 20, 1955  G. R. SPIES, JR  2,727,567
SCARFING TORCH
Filed May 5, 1949  3 Sheets-Sheet 1

INVENTOR
GEORGE R. SPIES JR
BY
ATTORNEYS

Dec. 20, 1955

G. R. SPIES, JR 2,727,567

SCARFING TORCH

Filed May 5, 1949

INVENTOR
GEORGE R. SPIES JR.
BY
ATTORNEYS

Dec. 20, 1955   G. R. SPIES, JR   2,727,567
SCARFING TORCH

Filed May 5, 1949   3 Sheets-Sheet 3

INVENTOR
GEORGE R. SPIES JR.
BY
ATTORNEYS

United States Patent Office 2,727,567
Patented Dec. 20, 1955

2,727,567
SCARFING TORCH

George R. Spies, Jr., Berkeley Heights, N. J., assignor to Air Reduction Company, Incorporated, a corporation of New York Application May 5, 1949, Serial No. 91,448

13 Claims. (Cl. 158—27.4)

This invention relates to gas torches of the kind used for operating on the surface of a metal body over a relatively wide area in a single pass. More particularly, the invention relates to scarfing torches of this type for desurfacing billets, blooms, and the like.

A scarfing torch for wide-area desurfacing operations is designed to direct against the surface of the work a row of preheating flame jets that extends transversely across the work surface, and also to project at an angle to the work surface a transversely extending row of scarfing oxygen jets. The scarfing oxygen jets with the aid of the flame jets thermochemically remove the surface metal of the workpiece when the scarfing torch is moved along the workpiece in the general direction in which the scarfing oxygen jets are projected or the workpiece is moved past the scarfing torch in the opposite direction. It is desirable that such a scarfing torch be provided with means for adjusting the operating length of the torch to suit the width of the particular workpiece to be scarfed. The same torch may then be employed for scarfing workpieces of different dimensions. The term "length" when used herein to designate a dimension of the torch means that dimension which corresponds with the width of the area operated upon by the torch. A simple way of adjusting the operating length of the torch to accommodate it to the width of a workpiece is to shut off the supply of gases to those discharge passages of the torch that are not needed when treating that particular workpiece, and it is the principal object of this invention to provide a scarfing torch having improved means by which this may be accomplished.

Another object of the invention is to provide a scarfing torch for wide-area scarfing operations having means which is operable to shut off the supply of scarfing oxygen to those scarfing oxygen discharge passages that are not needed when scarfing a workpiece and to simultaneously shut off the supply of preheating gases to those preheating gas discharge passages which are in excess of those necessary to produce the required number of flame jets for that particular workpiece.

A further object is to provide a scarfing torch for wide-area scarfing operations having means for shielding or protecting the discharge orifices of those gas passages from which the gas supply is shut off, such means being adjustable simultaneously with the means that adjusts the operating length of the torch.

The principle of the invention is applicable to simple heating torches having no means for projecting any scarfing oxygen jets at all but adapted to heat the surface of a metal body over a relatively wide area in a single pass. It is therefore an object of the invention to provide such a heating torch with improved means which is operable to shut off the supply of flame-producing gases to the discharge passages which are in excess of those needed to supply the requisite number of flame jets for treating a particular workpiece.

A still further object of the invention is to provide a gas torch, either of the scarfing type or simple heating type, for wide-area operations and having means for varying the operating length of the torch that does not require the use of any part which at any time extends any appreciable distance beyond either end of the torch.

According to the invention the gas torch has a distributing chamber for each of the gases discharged by the torch and each distributing chamber extends substantially throughout the entire effective length of the torch and has exit passages at intervals along its length communicating with the discharge face of the torch. Gas is delivered to each distributing chamber at one end portion thereof and a piston is movably mounted in its other end portion. In its innermost position the piston confines the gas to the inlet end portion of the distributing chamber from which it can flow uninterruptedly through a number of the exit gas passages which are in permanent communication with the distributing chamber and which are not controlled by the piston. The piston controls the flow of gas from the distributing chamber into the remaining exit passages so that the number of such remaining exit passages into which the gas can pass from the distributing chamber depends upon the position of the piston in the distributing chamber, all of the controlled exit passages being blocked off when the piston is in its innermost position and all of them being in communication with the distributing chamber when the piston is in its outermost position. The piston rides as a nut on a threaded shaft and can be moved in the distributing chamber by rotation of the shaft. Only the portion of the shaft on which the piston moves is threaded, and novel sealing means carried by the piston cooperates with the unthreaded portion of the shaft regardless of the position of the piston along the shaft. If the torch has more than one distributing chamber containing a piston the actuating shafts of all such distributing chambers are geared together and are operated in unison whereby all of the pistons can be simultaneously and correspondingly adjusted in their respective distributing chambers. The portion of each distributing chamber through which each piston moves is enlarged to receive a number of liner rings, one for each exit passage leading from the distributing chamber. Each of these rings has radial ports which are controlled by the piston, and also has an annular chamber which places all of the radial ports in communication with the corresponding exit passage leading from the distributing chamber. A sealing gasket seals the joint between the outer periphery of each liner ring and the interior wall of the enlarged portion of the distributing chamber, and sealing gasket means is provided between the inner circumference of each liner ring and the sliding piston.

In the preferred form of the invention, i. e., the form in which the improved means for varying the operating length of the torch is applied to a scarfing torch, there is a distributing chamber for the scarfing oxygen, a distributing chamber for the preheating oxygen, and a distributing chamber for the preheating fuel-gas such as acetylene, and each of the distributing chambers is constructed as above set forth and provided with a piston operating on a threaded shaft, all of the shafts being simultaneously actuated through gearing at the end of the torch to move the pistons in unison. In addition, a protecting shield may be mounted on the torch to move in front of the discharge orifices of the gas passages that are controlled by the pistons, and may be operatively connected to said gearing so that its position is adjusted in accordance with the adjustment of the pistons in the distributing chambers whereby it will cover the discharge orifices of all of the gas passages that are blocked off by the pistons and thereby protect them from flying products of the reaction.

Other objects and advantages of the invention will be apparent from the following description and the accompanying drawings, in which.

Figure 1:
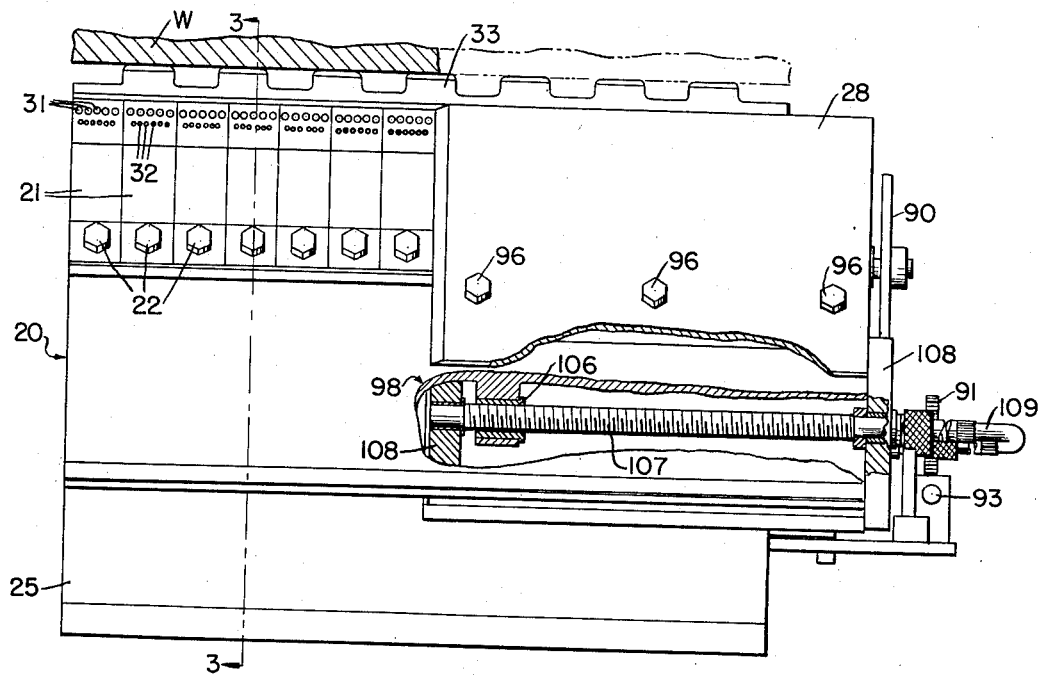
Figure 1 is a front elevation of a scarfing torch embodying the invention, some of the parts being shown in vertical section.
Figure 3:
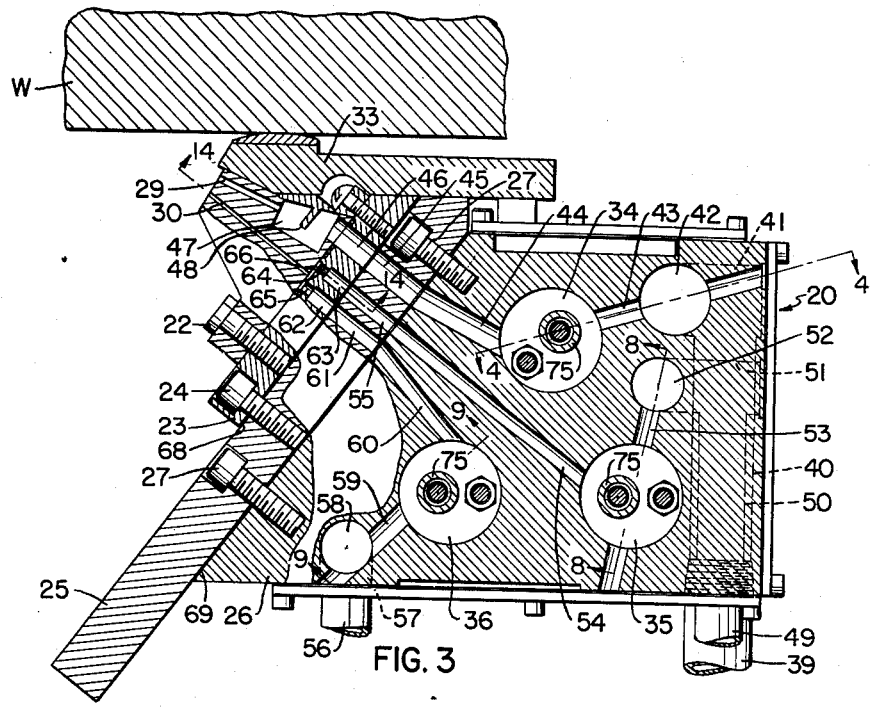
Fig. 3 is a vertical transverse section of the torch shown in Fig. 1, the section being taken approximately on the line 3—3 of Fig. 1.
Figure 13:
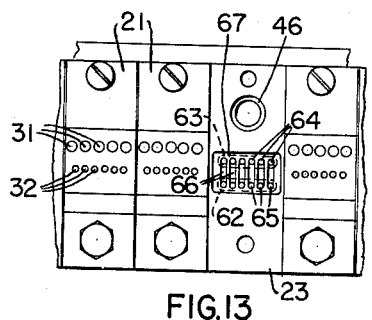
Figure 14:
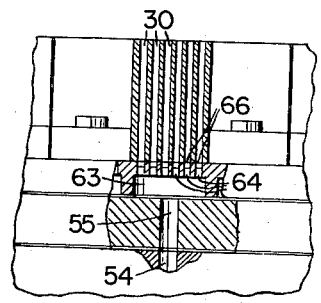

Fig. 13 is a front elevation of a portion of the discharge face of the scarfing torch shown in Fig. 1 with one of the tip segments removed to show the arrangement of mixing slots for the preheating gases; and Fig. 14 is a section through a single tip segment taken approximately on the line 14—14 of Fig. 3, the tip segments at opposite sides of the one shown in section being also shown but not in section.

Figure 2:
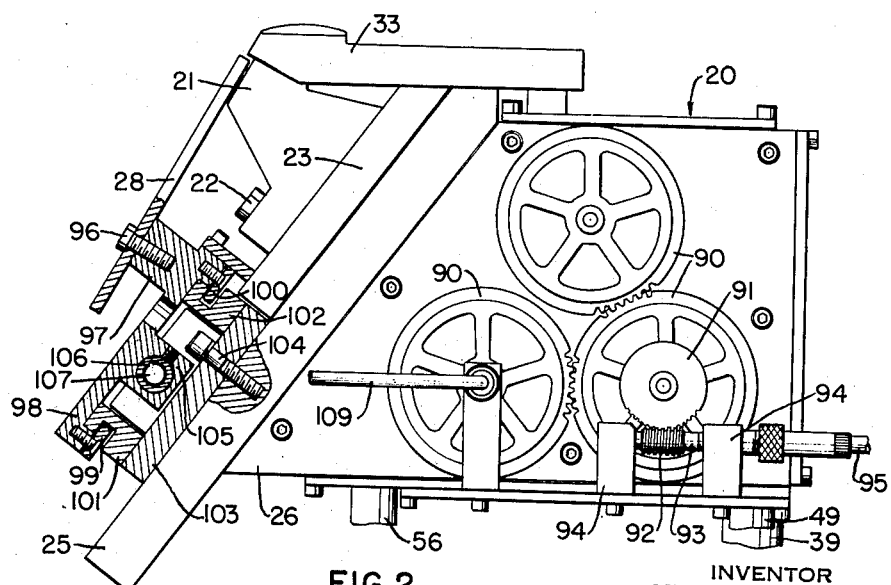
Fig. 2 is a right end elevation of the torch shown in Fig. 1, some of the parts being shown in vertical section.

Although the invention is applicable to gas torches of various types for performing wide-area scarfing or heating operations on metal bodies, it has been illustrated in the accompanying drawings as applied to a particular kind of wide-area scarfing torch. The particular scarfing torch illustrated, as best shown in Figs. 1 and 2, is of the segmental tip type, i. e. the type having a series of individual tip segments each of which has a number of jet passages terminating in discharge orifices at the discharge face of the torch through which the scarfing oxygen and the preheating gases for the flames are discharged. The tip segments are associated with a manifold block in which are formed the various gas distributing chambers and the gas passages leading from them to the tip segments. In Figs. 1, 2 and 3 the scarfing torch is denoted in general by the reference numeral 20. The individual tip segments are shown at 21. Each of the tip segments is secured by means of bolts 22 to a plate 23. As best shown in Fig. 3, the plate 23 is secured by means of bolts 24 to a plate 25 which in turn is bolted directly to the manifold block 26 (Fig. 3) by means of bolts 27. In Fig. 1 all of the tip segments do not appear, some of them at the right side of the torch being obscured by an adjustable shield 28 which will hereinafter be more fully described.

One of the jet passages in the tip segments through which the scarfing oxygen is discharged appears at 29 in Fig. 3, and one of the jet passages in the tip segments through which the combustible gas mixture for the preheating flames is discharged appears at 30 in this figure. The scarfing oxygen jet passages in each tip segment terminate in a row of discharge orifices 31 at the discharge face of the tip (Fig. 1), and the preheat jet passages 30 in each tip segment terminate in a row of discharge orifices 32 in the discharge face of the torch. The rows of scarfing oxygen discharge orifices in all the tip segments are in alignment to produce one continuous row extending throughout the effective length of the discharge face of the torch, and the same is true of the preheat discharge orifices. The particular scarfing torch shown in the drawing was designed primarily for scarfing the lower surface of a workpiece represented at W in Figs. 1 and 3, and the scarfing torch is therefore shown under the workpiece with the jet passages 29 and 30 directed diagonally upward toward the lower surface of the workpiece, the arrangement of the jet passages being such that the jets of scarfing oxygen and the flame jets impinge upon substantially the same area of the work surface. A shoe section 33 at the top of the torch has wear-resistant portions which bear against the lower surface of the workpiece W.

As best shown in Fig. 3, the manifold block 26 has three horizontal longitudinally extending bores 34, 35 and 36. The ends of these bores are closed by end plates 37 and 38 secured to the ends of the manifold block. The bore 34 constitutes a distributing chamber for the scarfing oxygen; the bore 35 constitutes a distributing chamber for the preheating oxygen; and the bore 36 constitutes a distributing chamber for the preheating fuel-gas such as acetylene.

Figure 4:
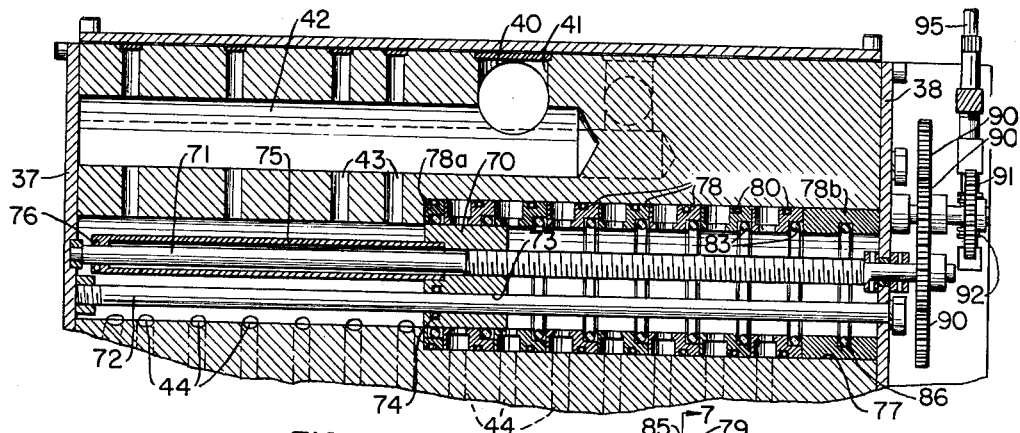
Fig. 4 is a partial horizontal section through the upper part of the scarfing torch shown in Fig. 3 illustrating the scarfing oxygen distributing chamber and the piston assembly therein, the section being taken approximately on the line 4—4 of Fig. 3.

Scarfing oxygen is delivered to the manifold block through a pipe 39 (Fig. 3) and flows through a vertically extending drilling 40 in the manifold block to a horizontal cross-drilling 41, thence into a bore 42. This bore is located in parallel relation with and adjacent to the scarfing oxygen distributing chamber 34 (see also Fig. 4 which is a section through this bore and the scarfing oxygen distributing chamber) and is drilled part way into the manifold block from one end thereof (the left end in Fig. 4). The bore 42 constitutes a primary distributing chamber from which the scarfing oxygen passes through a row of passages 43 into the left end portion of the scarfing oxygen distributing chamber 34 (Fig. 4). A series of drillings 44, spaced along the distributing chamber 34 so that each drilling corresponds in position to one of the tip segments 21, extend from the distributing chamber to the face of the manifold block on which the plate 25 is secured. These drillings constitute exit passages through which the scarfing oxygen leaves the distributing chamber 34. The scarfing oxygen that flows through each of the exit passages 44 passes through a drilling 45 in the plate 25 and a similar drilling 46 in the plate 23 and is delivered to a chamber 47 in the corresponding tip segment. This chamber has a baffle 48 to deflect the scarfing oxygen entering the chamber and cause it to issue uniformly through all of the jet passages 29 of the tip segment.

Figure 8:
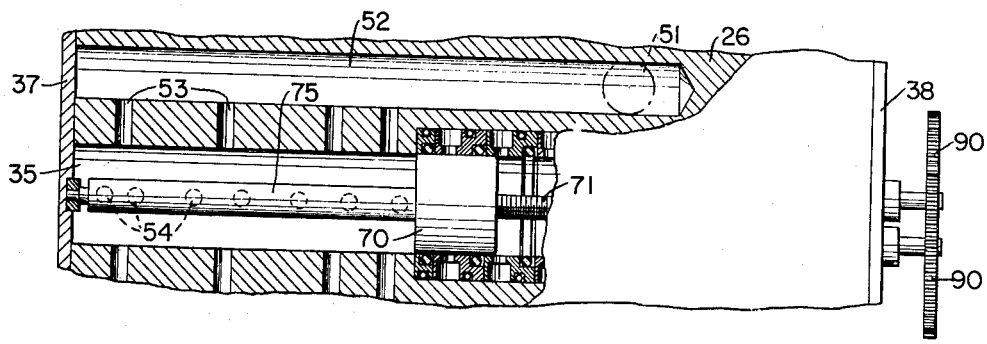
Fig. 8 is a partial vertical section through a preheating oxygen distributing chamber and the piston assembly therein, the section being taken approximately on the line 8—8 of Fig. 3.

Oxygen for the preheating flames is delivered to the manifold block through a pipe 49 (Fig. 3). It passes through a vertically extending drilling 50 in the manifold block to a horizontal cross-drilling 51, thence to a bore 52. This bore is located in parallel relation with and adjacent to the preheating oxygen distributing chamber 35 (see also Fig. 8 which is a section through this bore and the preheating oxygen distributing chamber). The bore 52, like the bore 42, is drilled part way into the manifold block from one end thereof (the left end in Fig. 8) and constitutes a primary distributing chamber for the preheating oxygen. The preheating oxygen passes from this primary distributing chamber into the left end portion of the main preheating oxygen distributing chamber 35 through a series of passages 53. A series of drillings 54, one for each of the tip segments, extend from the preheating oxygen distributing chamber 35 to the face of the manifold block to which the plate 25 is secured. The preheating oxygen flowing in each of the passages 54 flows through a corresponding drilling 55 in the plate 25 and thence through the plate 23 in the manner hereinafter described to the corresponding tip segment.

Figure 9:
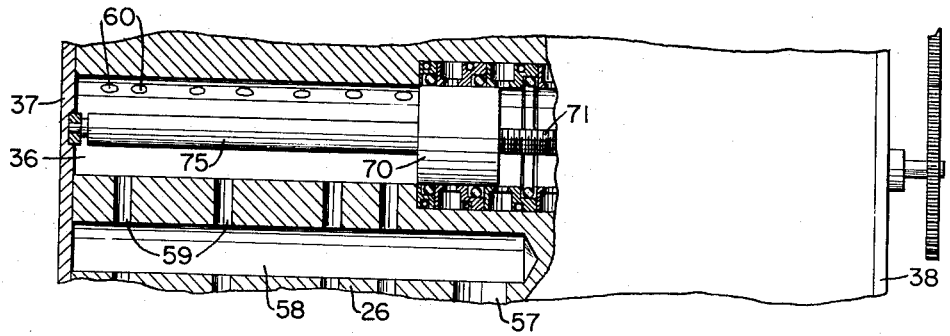
Fig. 9 is a partial vertical section through the fuel-gas distributing chamber and the piston assembly therein, the section being taken approximately on the line 9—9 of Fig. 3.

The preheating acetylene is delivered to the manifold block through a pipe 56 (Fig. 3). It then flows through a short vertically extending drilling 57 in the manifold block to a bore 58 located in parallel relation with and adjacent to the acetylene distributing chamber 36 (see also Fig. 9 which is a section taken through this bore and the acetylene distributing chamber). The bore 58 like the bores 42 and 52 is drilled part way into the manifold block from one end thereof (the left end in Fig. 9) and constitutes a primary distributing chamber for the acetylene. The acetylene passes from this primary distributing chamber into the left end portion of the main acetylene distributing chamber 36 through a series of passages 59. A series of drillings 60, one for each of the tip segments, extend from the acetylene distributing chamber 36 to the face of the manifold block to which the plate 25 is secured. The acetylene flowing in each drilling 60 passes through an extension drilling 61 in the plate 25. Each of the drillings 61 opens into a recess 62 (Fig. 3) provided in the lower face of the plate 23 under one of the tip segments. The preheating oxygen which reaches the plate 23 through each of the drillings 55 in the plate 25 enters a similar recess 63 in the lower face of the plate 23 located just above and parallel to the recess 62. There is one acetylene recess 62 and one preheating oxygen recess 63 for each tip segment. They are elongated lengthwise of the torch, their length being slightly less than the width of the tip segment as best shown in Fig. 14. A horizontal row of drillings 64 (Figs. 3, 13 and 14) extend from the preheating oxygen recess 63 to the upper face of the plate 23 and a similar horizontal row of the drillings 65 extend from the acetylene recess 62 to the upper face of the plate 23. The upper face of the plate 23 under each tip segment is provided with a group of narrow shallow vertically-extending slots 66 which are best shown in Fig. 13 in which one of the tip segments is omitted to expose the outer face of the plate 23 and these slots. There is one of such slots for each preheating jet passage 30 leading to the discharge face of the torch. Each of them communicates at its upper end with one of the drillings 64 extending from the preheating oxygen recess 63 and at its lower end with a companion drilling 65 extending from the acetylene recess 62, and each of them communicates at a point intermediate its ends with one of the preheating jet passages 30 as best shown in Figs. 3 and 14. Thus, it will be seen that acetylene and preheating oxygen entering the opposite ends of each shallow slot 66 from the recesses 62 and 63 mix in the narrow slot and the mixture then passes through the corresponding preheating jet passage 30 to the discharge face of the torch where it feeds one of the preheating flames.

A thin gasket such as a copper shim 67 (Fig. 13), clamped between each of the tip segments and the plate 23, seals the corresponding group of slots 66 from adjacent groups of the slots and seals the individual slots from each other. Each gasket is retained in a recess in the outer face of the plate 23 so that when the tip segments are clamped to this plate the gaskets are compressed and the outer face of the plate 23 and the abutting faces of the tip segments are brought into flush contact. A single gasket 68 (Fig. 3) provides a gas-tight seal between the plates 23 and 25, and a single gasket 69 provides a gas-tight seal between the plate 25 and the manifold block 26.

Within each of the main gas distributing chambers 34, 35 and 36 there is a slidable piston for blocking off any selected number of its exit passages at one end portion of the distributing chamber; an actuating shaft extending through the distributing chamber and through the piston and which has threaded engagement throughout part of its length with the piston so that rotation of the shaft adjusts the position of the piston in the distributing chamber; and a special arrangement of liner rings in the portion of the distributing chamber in which the piston moves. These features are the same in all of the distributing chambers, so a description of the interior parts of one of the distributing chambers will suffice for all of them. The particular distributing chamber whose interior parts will be described is the scarfing oxygen distributing chamber 34 shown in Fig. 4. The piston just referred to is shown at 70 and the actuating shaft at 71. The actuating shaft may be mounted at its opposite ends in bearings located in the end plates 37 and 38 of the torch. The actuating shaft has threaded engagement with the piston throughout about half the length of the shaft, the threaded portion of the shaft being located in the end portion of the distributing chamber remote from the end into which the gas enters. The actuating shaft passes eccentrically through the piston so that when the shaft is rotated the piston will not rotate with the shaft but it will be moved longitudinally along the shaft by the threaded engagement between the shaft and the piston. When the distributing chamber is sufficiently large in diameter to permit the use of a piston of large diameter the eccentricity between the actuating shaft and the piston can be made great enough to hold the piston against rotation without producing excessive friction between the inner wall of the distributing chamber and the sliding piston. Otherwise it has been found desirable to provide a rod 72 in the distributing chamber positioned in parallel relation with the actuating shaft and mounted at its opposite ends in the end plates 37 and 38 of the torch, and to provide an additional opening 73 in the piston to receive this rod. A gas-tight seal between the rod and the piston is effected by means of ring gaskets 74. The rod assists in holding the piston against rotation when the actuating shaft is rotated and thereby enables the piston to move through the distributing chamber more easily without excessive friction against the inner wall of the distributing chamber.

By rotating the actuating shaft 71 the piston can be moved to any position along the right end portion of the distributing chamber from a position at the extreme right end of the distributing chamber to its innermost position shown in Fig. 4, and vice versa. Since the gas enters the distributing chamber through the passages 43 to the left of the piston it will be confined to the left end portion of the distributing chamber when the piston is in its innermost position shown in Fig. 4. The exit passages 44 to the left of the piston when the piston is in its innermost position, are in permanent communication with the distributing chamber. In other words, these exit passages are not controlled by the piston. Therefore, the effective length of the torch cannot be made less than the length of the row of uncontrolled exit passages 44, but in practice the torch would probably never be called upon to scarf areas having a less width than this. As the piston moves farther toward the right from the position shown in Fig. 4 additional exit passages are successively placed in communication with the distributing chamber until all of them are in communication with it when the piston is in its extreme right-hand position.

Figure 5:
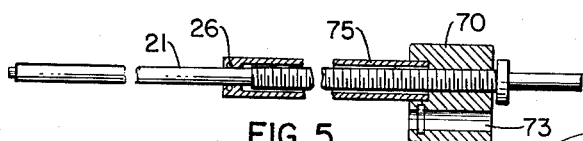
Fig. 5 is a detail view of one of the piston assemblies, the piston and the gas-tight sealing means between the piston and its actuating shaft being shown in horizontal section.

The piston 70 is provided with a tubular extension 75 which concentrically surrounds the actuating shaft and projects toward the left end of the distributing chamber. The outer end of this tubular extension has a ring gasket 76 which furnishes a gas-tight seal between the tubular extension and the smooth unthreaded portion of the actuating shaft. The extension 75 is long enough to cause the ring gasket 76 to cooperate with the smooth portion of the shaft no matter what position the piston occupies in the distributing chamber. This will be clear from Fig. 5 which illustrates the piston assembly removed from the distributing chamber and shows the piston at its extreme right-hand position in which the gasket 76 is still in engagement with the smooth unthreaded portion of the shaft.

Figures 6, 7:
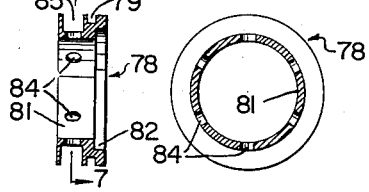
Figs. 6 and 7 illustrate one of the liner rings which line the portion of each distributing chamber in which the piston moves, Fig. 6 being a section taken along one diameter of the liner ring and Fig. 7 being a section taken on the line 7—7 of Fig. 6.

The portion of the distributing chamber in which the piston slides is enlarged in diameter as shown at 77 to receive a number of juxtaposed liner rings 78 one of which is illustrated in Figs. 6 and 7. The ring shown in these figures has a peripheral annular groove 79 adapted to receive a ring gasket 80 (Fig. 4), and the inner face 81 of the ring is recessed at one end of the ring as shown at 82 to receive a ring gasket 83 (Fig. 4). A series of radial ports 84 pass through the ring from its inner face 81 to a peripheral recess 85 which constitutes an annular gas chamber with which all of the radial ports 34 communicate. When the rings are positioned in the enlarged portion 77 of the distributing chamber in contacting relation they form a lining for this portion of the distributing chamber, the inner diameter of the rings being only slightly greater than the diameter of the piston so that the piston can move through the rings snugly but freely. When the rings are positioned the ring gaskets 80 are compressed against the wall of the enlarged portion 77 of the distributing chamber and provide a gas-tight seal at the periphery of each liner ring. Each gasket 83 provides a gas-tight seal between its liner ring and the piston as the piston moves through the ring. Thus, gas cannot escape past the piston or the liner rings to any portion of the distributing chamber to the right of the piston. The annular gas chamber 85 of each liner ring registers with one of the exit passages 44 leading from the distributing chamber. As the piston moves through the rings it controls the supply of gas to the exit passages 44 by covering or uncovering the ports 84 in the rings.

The innermost liner ring 78a and the outermost one 78b may be of somewhat different construction from the other liner rings. The innermost one 78a may have a peripheral gasket and an inner gasket like the other rings to prevent leakage of gas into the gas passages in the next ring when the piston is in the position shown in Fig. 4, but has no gas passages of its own. The outermost ring 78b may be a simple ring of sufficient length to accommodate the piston when it is moved to its extreme right-hand position. It need have no peripheral gasket but preferably has a gasket 86 positioned in a recess in the inner face of the ring to provide a gas-tight seal around the piston when the piston is in its extreme right-hand position.

Figure 10:
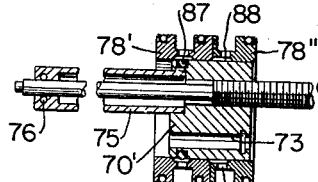
Fig. 10 is a horizontal section through a modified form of piston assembly.
Figures 11, 12:
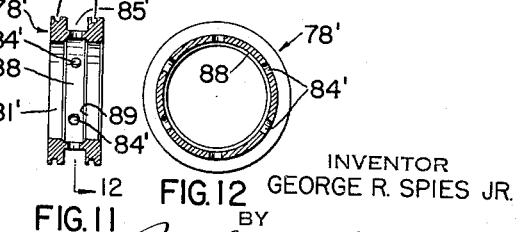
Figs. 11 and 12 illustrate a modified type of liner ring that may be used to line the portion of the distributing chamber in which a piston assembly of the kind shown in Fig. 10 operates, Fig 11 being a section taken along one diameter of the liner ring and Fig. 12 being a section taken on the line 12—12 of Fig. 11.

If desired, the gas-tight seal surrounding the piston may be effected by omitting the ring gasket at the inner face of each liner ring and by providing one or more ring gaskets on the piston itself. Such an arrangement is illustrated in Figs. 10—12. In this case the piston 70' is provided with a ring gasket 87. The liner rings may be of the type shown at 78' in Figs. 11 and 12 having a peripheral annular gas chamber 85' located midway between its ends, and having peripheral grooves 79' at opposite sides of the gas chamber 85' to receive peripheral ring gaskets, or they may be of the type shown at 78" at the right of Fig. 10 having only one peripheral groove for a peripheral ring gasket, or the two types of rings may be used in combination as shown in Fig. 10. In any event, no ring gaskets are necessary at the inner face of the liner rings since the piston carries the ring gasket or gaskets which prevent the gas from escaping past the piston. However, when this type of sealing means for the piston is employed it is desirable to provide, in the inner face 81' of each liner ring of the type shown in Figs. 11 and 12, an annular recess 88 into which the radial ports 84' open, and to bevel the edges of the recess as shown at 89. If the liner ring is of the type shown at 78" in Fig. 10, the annular recess 88 in the inner face of the ring may be at the left end of the ring, the lower right-hand corner of the adjacent ring 78' then being bevelled to form the second bevelled edge of the recess. The annular recesses 88 at the inner faces of the rings prevent the ring gasket or gaskets on the piston from coming in contact with the sharp edges of the radial ports 84' and being damaged thereby. The bevels at the edges of the annular recesses 88 remove sharp corners which would otherwise occur at these edges and which might damage the ring gasket or gaskets on the piston. In the preferred form of the invention in which the ring gaskets for sealing the piston itself are carried by the liner rings and therefore do not move through the distributing chamber, no inner annular recess for the ring ports to open into is required.

The right end of the piston actuating shaft in each of the three distributing chambers projects beyond the end plate 38 of the torch and has secured to it a gear 90 as shown in Fig. 2. The gear on one of the shafts meshes with the other two gears so that when one shaft is turned they are all turned simultaneously. One of the shafts carries a worm wheel 91 meshing with a worm 92 carried on a shaft 93 which is journaled in stanchion blocks 94. The worm 92 may be driven in any suitable way, as by means of a flexible drive cable 95 rotated by hand or from an electric motor. It will thus be apparent that when the cable 95 is rotated the pistons in all of the distributing chambers are simultaneously adjusted. When the torch is assembled the pistons are positioned on the actuating shafts so that all of the pistons will be substantially the same distance from the right end of the torch. Moreover, the actuating shafts are threaded in the right direction relative to the direction of rotation of the gears 90 to cause all of the pistons to move in the same direction when the drive cable 95 is rotated. By rotating the cable 95 an appropriate amount, the pistons are simultaneously adjusted in the distributing chambers to shut off the supply of both the scarfing oxygen and the preheating gases to those tip segments which are in excess of those needed when scarfing a particular workpiece.

The means herein described for varying the operating length of the torch does not require the use of any part which projects any substantial distance beyond either end of the torch at any time as would be the case if each piston were mounted on a piston rod which would have to slide a substantial distance beyond the end of the torch in order to permit the piston to move to the end of its distributing chamber. This would prevent the torch from being used in many instances where space to accommodate the projecting piston rods is not available. While the gearing for rotating the actuating shafts of the pistons requires some space at one end of the torch, it does not require anywhere near the amount of space that would be required by projecting piston rods of the kind just mentioned. Gas burners or torches heretofore proposed having a distributing chamber and an adjustable piston therein, and in which the piston is adjusted in the distributing chamber by the rotation of a shaft having threaded engagement with the piston, have not proved satisfactory for the lack of suitable sealing means for sealing the blocked off portion of the distributing chamber from the portion of the distributing chamber containing the gas.

The tip segments to which the gas supply is shut off by the pistons in the distributing chambers may be covered by the adjustable shield 28 referred to in the first part of the description. The shield protects the discharge orifices of the inactive tip segments from flying slag and molten metal which might otherwise clog them. The shield may be secured by means of bolts 96 (Fig. 2) to a raised rib 97 on a carriage 98. The carriage has a pair of inwardly extending flanges 99 and 100 secured to its underside which engage in corresponding grooves in a pair of guides 101 and 102 mounted on a plate 103 that is secured by means of bolts 104 to the lower portion of the upper face of the previously described plate 25. Thus the carriage 98 is slidably mounted on the guides 100 and 101 for movement lengthwise of the torch to adjust the position of the shield 28. The underside of the carriage 98 has a boss 105 (see also Fig. 1) in which there is inserted a bearing bushing 106 which has threaded engagement with a shaft 107 journalled in a pair of plates 108. The shaft 107 is preferably rotated by means of a flexible cable 109 which connects the shaft with one of the three piston-actuating shafts in the gas distributing chambers (Fig. 2). Thus, when the drive cable 95 is rotated to adjust the effective length of the torch by simultaneously adjusting the pistons in the gas distributing chambers, the position of the shield 28 is simultaneously adjusted to cover the discharge orifices of those tip segments to which the gas supply is shut off by the pistons. In Fig. 1 the shield is shown covering all but seven tip segments at the left end of the torch. This position of the shield corresponds to the position of the pistons shown in Figs. 4, 8 and 9 in which the gases are permitted to flow uninterruptedly to the seven tip segments not covered by the shield. The torch then has its minimum effective length, and a workpiece to which the torch is then suited is represented by the cross-sectioned portion of the workpiece in Fig. 1. If the torch has its maximum effective length it is suitable for scarfing a workpiece represented by both the cross-sectioned and phantom portions of the workpiece in Fig. 1. As the pistons are moved to the right from the position shown in Figs. 4, 8 and 9 to permit the gases to flow to additional tip segments, the shield 28 is moved a corresponding amount to the right to uncover the additional tip segments to which the gases are supplied. It should be understood that the shield 28 and its actuating mechanism constitute an additional feature of the invention and not an indispensable part of it. The shield when moved to its extreme right-hand position as viewed in Fig. 1 to uncover all of the tip segments projects beyond the confines of the torch in a manner in which it is one object of the invention to avoid. Therefore, the use of the shield is contemplated only when space permits. Moreover, in scarfing operations the shield is necessary only on a torch that scarfs the lower surface of the workpiece as shown in the drawings. In this position of the torch molten slag and metal is likely to fall on any exposed tip segments not in use and possibly clog their discharge orifices.

The lower portion of the plate 25 serves as a bracket by which the torch assembly may be attached to a suitable frame that supports the torch in proper relation to the workpiece.

As previously stated, the principle of the invention is applicable to simple heating torches or burners adapted to heat the surface of a metal body over a relatively wide area. Such a burner might be used, for instance, in welding the ends of successive strips in a continuous tube welding mill and would, of course, have no provision for supplying scarfing oxygen but only distributing chambers and passages for supplying the necessary gases for welding flames.

If desired, the piston in the preheating fuel-gas distributing chamber may be offset a small amount with respect to the piston in the preheating oxygen distributing chamber so that in extending the operating length of the torch the fuel-gas will come on and be ignited before the preheating oxygen comes on, and when the pistons are moved in the opposite direction the preheating oxygen will be shut off first and then the fuel-gas. This avoids flashbacks, as is well understood in the art.

The terms of orientation herein used apply to the torch when it is positioned to scarf the lower surface of a workpiece as shown in the drawings, but the torch may, of course, be used in other positions for scarfing the upper surface of the workpiece or its side surfaces.

I claim:

1. A gas torch having a discharge face and also having a gas distributing chamber of circular cross-section and a number of gas passages leading from the distributing chamber to the discharge face, the entrances to said gas passages being arranged in a row extending lengthwise of the distributing chamber, means for supplying gas to the distributing chamber at one end portion thereof, a piston movable in said distributing chamber the position of which determines the number of the gas passages into which the gas can flow from the distributing chamber, an actuating shaft extending through the distributing chamber longitudinally thereof and through the piston, means fixing said shaft against all but rotational movement about its longitudinal axis, said shaft having threaded engagement with the piston, and means for rotating the shaft, the actuating shaft extending eccentrically through the piston whereby when the shaft is rotated the piston will be held against rotation but will move in the distributing chamber longitudinally thereof.

2. A gas torch in accordance with claim 1 having a rod in said distributing chamber in parallel relation with said actuating shaft, the piston having an opening through which the rod passes whereby the piston when moved in the distributing chamber by rotation of the actuating shaft slides on the rod and the rod assists in holding the piston against rotation.

3. A gas torch having a discharge face and also having a gas distributing chamber of circular cross-section and a number of gas passages leading from the distributing chamber to the discharge face, the entrances to said gas passages being arranged in a row extending lengthwise of the distributing chamber, means for supplying gas to the distributing chamber at one end portion thereof, a piston movable in said distributing chamber the position of which determines the number of the gas passages into which the gas can flow from the distributing chamber, an actuating shaft extending through the distributing chamber longitudinally thereof and through the piston, means fixing said shaft against all but rotational movement about its longitudinal axis, said shaft having threaded engagement with the piston, means for rotating the shaft, a rod extending through the distributing chamber in parallel relation with the actuating shaft, the piston having an opening through which the rod passes whereby when the actuating shaft is rotated the piston will be held against rotation by the rod but will slide thereon and will move in the distributing chamber longitudinally thereof, and sealing means around said rod preventing the leakage of gas past the piston through said opening in the piston.

4. A gas torch having a discharge face and also having a gas distributing chamber and a number of gas passages leading from the distributing chamber to the discharge face, the entrances to said gas passages being arranged in a row extending lengthwise of the distributing chamber, means for supplying gas to the distributing chamber at one end portion thereof, a piston movable in said distributing chamber the position of which determines the number of the gas passages into which the gas can flow from the distributing chamber, an actuating shaft extending through the distributing chamber longitudinally thereof and through the piston, one end portion of said shaft having threaded engagement with the piston and the other end portion of the shaft being unthreaded and smooth, means for rotating the shaft to thereby move the piston in the distributing chamber along the threaded portion of the shaft, a tubular extension on the piston surrounding the actuating shaft and projecting toward the unthreaded end of the shaft, and sealing means carried by said tubular extension and cooperating with the smooth portion of the actuating shaft in any position of the piston along the threaded portion of the shaft to effect a gas-tight seal between the tubular extension and the smooth portion of the actuating shaft.

5. A gas torch in accordance with claim 4 in which said sealing means is a ring gasket carried by the distal end of the tubular extension on the piston and which moves in contact with the smooth portion of the actuating shaft.

6. A gas torch having a discharge face and also having a plurality of gas distributing chambers and a number of gas passages leading from each distributing chamber to the discharge face, the entrances to the gas passages leading from each distributing chamber being arranged in a row extending lengthwise of such distributing chamber, means for supplying gas to each distributing chamber at one end portion thereof, a piston movable in each distributing chamber the position of which determines the number of the gas passages into which the gas can flow from such distributing chamber, an actuating shaft extending through each distributing chamber longitudinally thereof and through the piston in such distributing chamber, each of said shafts having threaded engagement with the corresponding piston, and means for simultaneously rotating the shafts in all the distributing chambers to move the pistons in unison longitudinally of the distributing chambers.

7. A gas torch in accordance with claim 6 in which the means for simultaneously rotating said shafts comprises gearing at one end of the torch operatively connecting the shafts, and means for imparting rotation to the gearing.

8. A scarfing torch having a discharge face, a scarfing oxygen distributing chamber, a preheating gas distributing chamber, and a number of gas passages leading from each distributing chamber to the discharge face, the entrances to the gas passages leading from each distributing chamber being arranged in a row extending lengthwise of such distributing chamber, means for supplying scarfing oxygen to the scarfing oxygen distributing chamber at one end portion thereof, means for supplying a preheating gas to the preheating gas distributing chamber at one end portion thereof, a piston movable in each distributing chamber the position of which determines the number of the gas passages into which the gas can flow from such distributing chamber, an actuating shaft extending through each distributing chamber longitudinally thereof and through the piston in such distributing chamber, each of said shafts having threaded engagement with the corresponding piston, and means for simultaneously rotating the shafts in all of the distributing chambers to move the pistons in unison longitudinally of the distributing chambers.

9. A scarfing torch having a discharge face, a scarfing oxygen distributing chamber, a preheating oxygen distributing chamber, a preheating fuel-gas distributing chamber, and a number of gas passages leading from each distributing chamber to the discharge face, the entrances to the gas passages leading from each distributing chamber being arranged in a row extending lengthwise of such distributing chamber, means for supplying scarfing oxygen to the scarfing oxygen distributing chamber at one end portion thereof, means for supplying preheating oxygen to the preheating oxygen distributing chamber at one end portion thereof, means for supplying preheating fuel-gas to the preheating fuel-gas distributing chamber at one end portion thereof, a piston movable in each distributing chamber the position of which determines the number of the gas passages into which the gas can flow from such distributing chamber, an actuating shaft extending through each distributing chamber longitudinally thereof and through the piston in such distributing chamber, each of said shafts having threaded engagement with the corresponding piston, and means for simultaneously rotating the shafts in all of the distributing chambers to move the pistons in unison longitudinally of the distributing chambers.

10. A gas torch having a discharge face and a gas distributing chamber of circular cross-section, means for supplying gas to the distributing chamber at one end portion thereof, a piston movable in said distributing chamber longitudinally of the distributing chamber, a lining in the portion of the distributing chamber in which the piston moves, said lining comprising a plurality of juxtaposed liner rings, sealing means at the periphery of each liner ring effecting a gas-tight seal between the periphery of such liner ring and the interior wall of the distributing chamber, sealing means effecting a gas-tight seal between each liner ring and the piston as the piston moves through such liner ring, each of said liner rings having a peripheral recess forming an annular gas chamber and having a plurality of radial ports placing such annular gas chamber in communication with the interior of the distributing chamber, and the torch having a plurality of gas passages leading from said liner rings to the discharge face of the torch and each of which communicates with the annular gas chamber of one of the liner rings, and means for adjusting the position of the piston in the distributing chamber.

11. A gas torch having a discharge face and a gas distributing chamber of circular cross-section, means for supplying gas to the distributing chamber at one end portion thereof, a piston movable in said distributing chamber longitudinally of the distributing chamber, a lining in the portion of the distributing chamber in which the piston moves, said lining comprising a plurality of juxtaposed liner rings, a ring gasket at the periphery of each of said liner rings effecting a gas-tight seal between the periphery of such liner ring and the interior wall of the distributing chamber, ring gasket sealing means effecting a gas-tight seal between each liner ring and the piston as the piston moves through such liner ring, each of said liner rings having a peripheral recess forming an annular gas chamber and having a plurality of radial ports placing such annular gas chamber in communication with the interior of the distributing chamber, and the torch having a plurality of gas passages leading from said liner rings to the discharge face of the torch and each of which communicates with the annular gas chamber of one of the liner rings, and means for adjusting the position of the piston in the distributing chamber.

12. A gas torch having a discharge face and a gas distributing chamber of circular cross-section, means for supplying gas to the distributing chamber at one end portion thereof, a piston movable in said distributing chamber longitudinally of the distributing chamber, a lining in the portion of the distributing chamber in which the piston moves, said lining comprising a plurality of juxtaposed liner rings, a ring gasket at the periphery of each liner ring effecting a gas-tight seal between the periphery of such liner ring and the interior wall of the distributing chamber, a ring gasket at the interior surface of each liner ring effecting a gas-tight seal between such liner ring and the piston as the piston moves through such liner ring, each of said liner rings having a peripheral recess forming an annular gas chamber and having a plurality of radial ports placing such annular gas chamber in communication with the interior of the distributing chamber, and the torch having a plurality of gas passages leading from said liner rings to the discharge face of the torch and each of which communicates with the annular gas chamber of one of the liner rings, and means for adjusting the position of the piston in the distributing chamber.

13. A gas torch having a discharge face and a gas distributing chamber of circular cross-section, means for supplying gas to the distributing chamber at one end portion thereof, the other end portion of the distributing chamber being enlarged in diameter, a lining in the enlarged portion of the distributing chamber, said lining comprising a plurality of juxtaposed liner rings, a piston movable through the liner rings, sealing means at the periphery of each liner ring effecting a gas-tight seal between the periphery of such liner ring and the interior wall of the enlarged portion of the distributing chamber, sealing means effecting a gas-tight seal between each liner ring and the piston as the piston moves through such liner ring, the torch having a plurality of gas passages leading from said liner rings to the discharge face of the torch, each of said liner rings having gas passages in communication with one of said last-named passages, said gas passages in each liner ring including radial ports that are controlled by said piston, and means for moving the piston through the liner rings.

References Cited in the file of this patent

UNITED STATES PATENTS

| | | |
|---|---|---|
| 21,510 | MacDonald | Sept. 14, 1858 |
| 1,216,167 | Riebsame | Feb. 13, 1917 |
| 2,199,951 | Gorman | May 7, 1940 |
| 2,228,114 | Hess | Jan. 7, 1941 |
| 2,230,826 | Burdett et al. | Feb. 4, 1941 |
| 2,309,128 | McGuire | Jan. 26, 1943 |
| 2,312,418 | Keller | Mar. 2, 1943 |
| 2,429,326 | Miller et al. | Oct. 21, 1947 |
| 2,447,081 | Miller et al. | Aug. 17, 1948 |
| 2,483,719 | Anderson | Oct. 4, 1949 |
| 2,515,301 | Hughey | July 18, 1950 |